INVENTORS
MARION A. CONDIE
LELAND S. REEL
BY Knox & Knox

INVENTORS
MARION A. CONDIE
LELAND S. REEL
BY
Knox & Knox

United States Patent Office 2,968,957
Patented Jan. 24, 1961

2,968,957

CENTRIPETAL ACCELERATION COMPENSATION COMPUTER FOR STABLE PLATFORM

Marion A. Condie, San Carlos, and Leland S. Reel, San Diego, Calif., assignors to Ryan Aeronautical Co., San Diego, Calif.

Filed Nov. 20, 1959, Ser. No. 854,409

7 Claims. (Cl. 74—5.47)

The present invention relates generally to gyro-stabilized platforms and more particularly to a centripetal acceleration compension computer for a stable platform.

The primary object of this invention is to provide a compensation computer which provides output signals for application to the erecting mechanism of a stable platform to compensate for centripetal accelerations of the vehicle, such as an aircraft or missile, in which the platform is mounted.

Another object of this invention is to provide a centripetal acceleration compensation computer which provides compensation signals corresponding to local turning of the vehicle and to motion over the spherical earth.

A further object of this invention is to provide a compensation computer which also includes corrections for rotation of the earth and latitude of the vehicle.

Finally, it is an object to provide a compensation computer of the aforementioned character which is simple to assemble and operate and which will give accurate results over a wide range of operating conditions.

Figure 1:
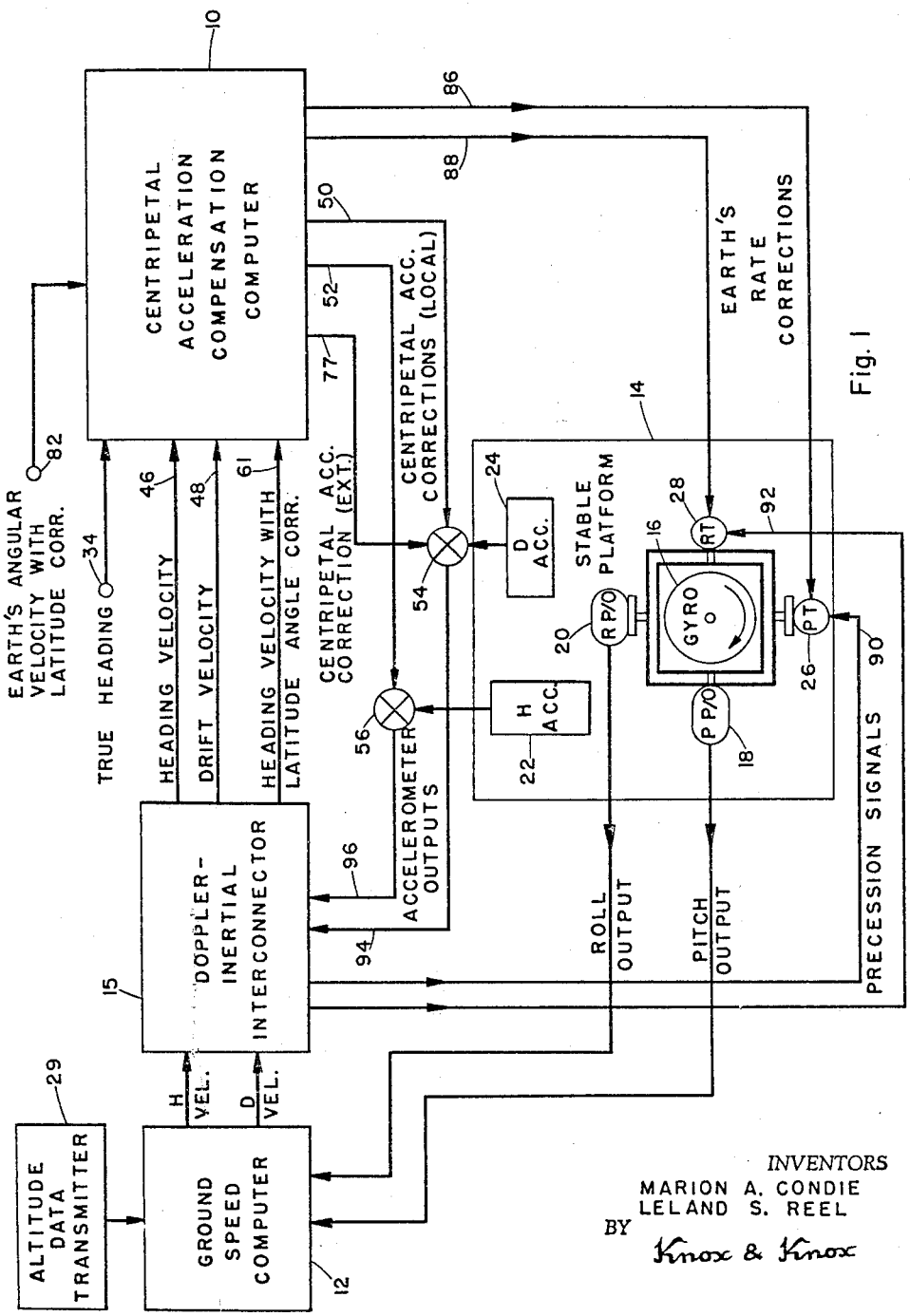
Figure 2:
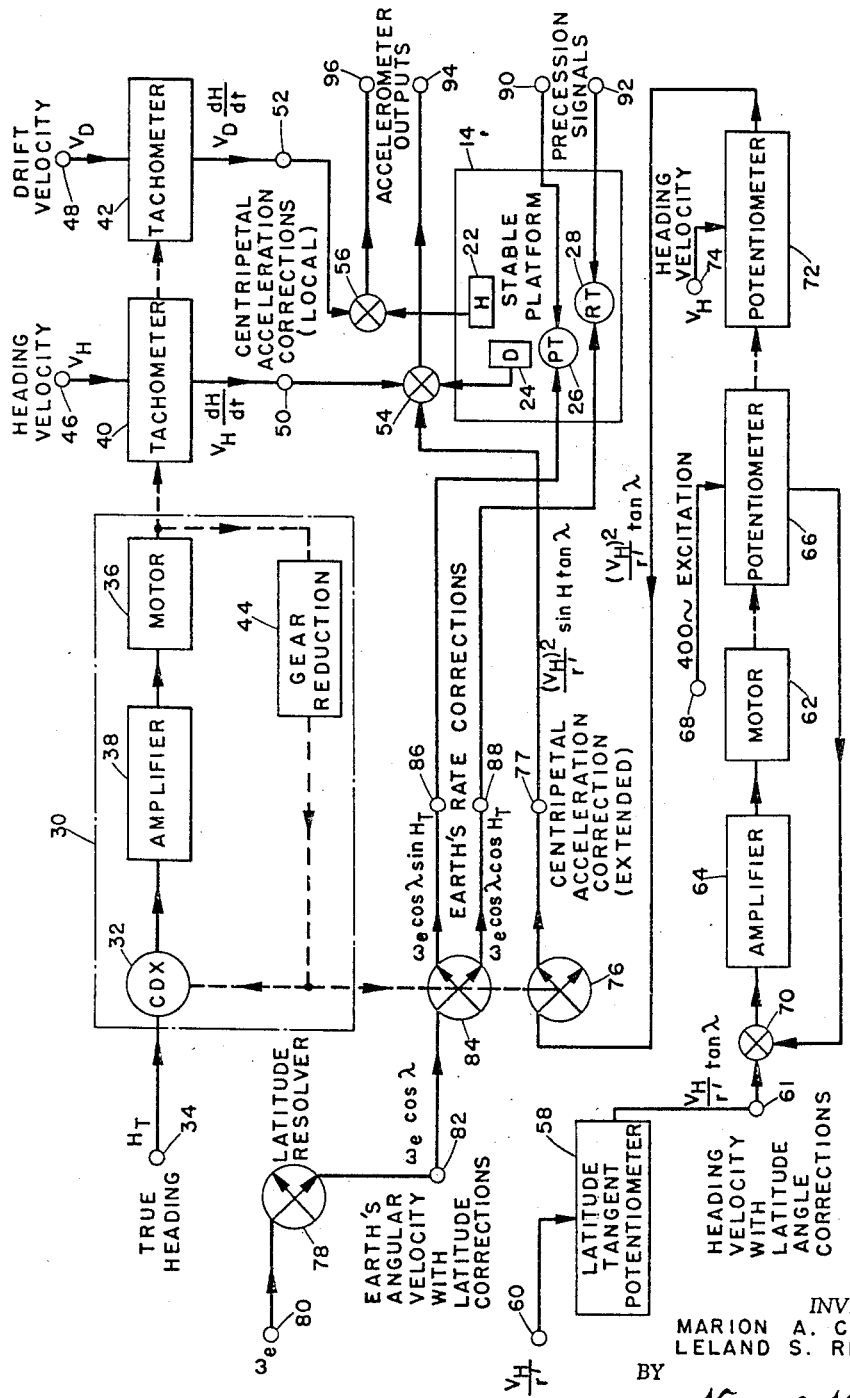

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

Figure 1 is a block diagram of a ground speed computer circuit incorporating the compensation computer; and Figure 2 is a block diagram of the compensating computer.

Similar characters of reference indicate similar or identical elements and portions throughout the specification and throughout the views of the drawings.

In an inertial navigation system, such as used in aircraft, the position of the aircraft at any time is computed from a known starting point using the velocity of the aircraft and its heading from the starting point. Since these factors are subject to constant change, the computing means must be in continuous operation and must be corrected for changes in velocity and heading. A gyro-stabilized platform is used to provide certain data indicating deviation of the aircraft from its course and, in order to be effective, the stable platform must be continually corrected to compensate for accelerations, rotation of the earth and other effects which might upset the alignment of the platform. For navigation over extended distances, the rotation of the earth must be taken into account as well as the centripetal accelerations of the aircraft, both in local turning and in relation to the earth's surface. A system for obtaining accurate ground velocity data is described in our copending application Serial No. 830,806, filed July 31, 1959, for a Doppler-inertial ground velocity indicator, the compensation computer described herein being particularly suitable for use with this system.

In Figure 1, the compensation computer 10 is provided with reference data from a ground speed computer 12 coupled to a stable platform 14, which provides a vertical reference and measurement of inertial accelerations, the coupling being made through a Doppler-inertial interconnector 15 as described in the above mentioned copending application. The stable platform 14 contains a gyroscope 16 having a pitch pick-off 18 and a roll pick-off 20 which provide signals proportional to the pitch and roll motions of the aircraft, the arrangement being well known. In addition, the stable platform has a heading accelerometer 22 and a drift accelerometer 24 which provide output signals proportional to the corresponding accelerations of the aircraft. The acceleration signals are fed to the Doppler-inertial interconnector 15 and are used to produce proportional precession signals which are fed back to the stable platform 14 and applied to the pitch torquer 26 and roll torquer 28 to erect the gyroscope 16. The procedure is well known and several methods have been evolved to so erect a gyroscope, one particularly accurate means being described in the above mentioned copending application, in which the instantaneous accuracy of an inertial system is combined with the long term accuracy of Doppler radar.

For maximum accuracy, the output signals from accelerometers 22 and 24 must be corrected by the addition of signals proportional to the centripetal accelerations of the aircraft, both in local turning and in extended flight over the earth's surface. Also, the precession signals from the Doppler-inertial interconnector 15 to the gyroscope torquers 26 and 28 must be corrected by the addition of signals corresponding to the earth's angular velocity, in order to maintain the gyro platform erect according to local plumb line vertical. In this last instance, the radius of curvature of the earth, which is a known factor, plus the altitude of the aircraft above the earth's surface, are parameters in determining the relative angular velocity of the aircraft over the surface of the earth, the altitude being obtained from an altitude data transmitter 29, which may be part of the conventional instrumentation of the vehicle.

The compensation computer 10 which provides the necessary corrections is illustrated in Figure 2, together with the pertinent portions of the stable platform 14. The centripetal acceleration corrections for local turning require that both the heading and drift velocities be multiplied by the time rate-of-change of heading. This is accomplished by multiplication through a heading follow-up servo 30 which includes a heading follow-up control transformer 32 receiving a signal $H_T$ from a true heading input 34, which is normally available in an aircraft. The control transformer 32 drives a two-phase servo motor 36 through amplifier 38, the servo motor driving a pair of tachometers 40 and 42 and also driving, through a suitable gear reduction 44, the control transformer itself, the mechanical drive being indicated in dash line. The tachometers 40 and 42 thus turn at a rate proportional to the rate-of-change of heading and are excited with signals from a heading velocity input 46 and a drift velocity input 48, respectively. The outputs 50 and 52 of tachometers 40 and 42 provide the local centripetal acceleration corrections which are added to the outputs of accelerometers 22 and 24 through mixing networks 54 and 56, respectively. Since centripetal accelerations in local turning are at right angles to the actual direction of motion, the accelerometers must receive the corrections for accelerations at right angles to their sensitive axes. Therefore, the output 50 of the heading channel is applied to the drift accelerometer 24 and the output 52 of the drift channel is applied to the heading accelerometer 22.

The signal obtained at the output 50 may be expressed by the term $$V_H \frac{dH}{dt}$$

and the signal at the output 52 by the term $$V_D \frac{dH}{dt}$$

where $V_H$ is the heading velocity, $V_D$ is the drift velocity, $H$ is the heading component and $$\frac{d}{dt}$$

is the time derivative. By way of further explanation, the corrections may be treated as accelerometer errors, the correction to the heading accelerometer 22 being expressed by $$V_D \frac{dH}{dt}$$

and the correction to the drift accelerometer 24 may be expressed by $$V_H \frac{dH}{dt}$$

The centripetal acceleration corrections needed for extended flight over the spherical earth requires that the square of the heading velocity be multiplied by the tangent of latitude and the sine of the heading angle. The latitude adjustment is made by a latitude tangent potentiometer 58, which may be manually operated or can be coupled with a source of latitude information in the navigational system, if such is available. The potentiometer 58 is suitably calibrated to provide a signal proportional to the tangent of latitude and is excited with a signal proportional to $$\frac{V_H}{r^1}$$

from an input 60, where $r^1$ is the computed radius of curvature of the earth plus the altitude of the aircraft above the earth's surface. The resultant output 61 of the potentiometer 58 is thus $$\frac{V_H}{r^1} \tan \lambda$$

where $\lambda$ is the latitude, this output being used to drive a servo motor 62 through an amplifier 64. The servo motor 62 is coupled to a potentiometer 66 which is excited by a 400 cycle input 68, the output thereof being fed back to the input of amplifier 64 through a mixing network 70, in the conventional closed servo loop arrangement. The servo motor 62 is further coupled to drive a linear potentiometer 72 which is excited with a heading velocity signal from input 74, the output of said linear potentiometer then being $$\frac{(V_H)^2}{r^1} \tan \lambda$$

This signal is fed through a sine of heading resolver 76 driven mechanically through the gear reduction 44 and is thus modified by a factor proportional to the sine of the true heading, the resultant generated signal at output 77 being $$\frac{(V_H)^2}{r^1} \sin H \tan \lambda$$

as required, and this is applied as the correction signal to the mixing network 54 of the drift accelerometer 24. The corrective function is expressed by $$(V_H)^2 \sin H \frac{\tan \lambda}{r_D}$$

Earth's rate correction is a function of the earth's rotation relative to the axes of freedom of the gyroscope 16 and can be expressed by $\omega_e \cos \lambda \sin H$ and $\omega_e \cos \lambda \cos H$, where $\omega_e$ is the earth's angular velocity. The correction is obtained by means of a latitude resolver 78, which may be provided with latitude data from any convenient source, either manual or automatic, and is excited by a signal proportional to the earth's angular velocity indicated as derived from an input 80. The resultant signal at output 82 is proportional to $\omega_e \cos \lambda$ and is passed through heading resolver 84 driven by the gear reduction 44, which provides factors proportional to the sine and cosine of true heading. Thus the correction signals generated by the resolver 84 at outputs 86 and 88 are proportional to $\omega_e \cos \lambda \sin H_T$ and $\omega_e \cos \lambda \cos H_T$, which are applied to the gyroscope torquers 26 and 28, respectively. These correction signals are added to the precession signals applied to the torquers 26 and 28 from inputs 90 and 92, the precession signals being computed by the Doppler-inertial interconnector 15 from the corrected accelerometer outputs 94 and 96 at mixing networks 54 and 56.

All of the input data required for operation of the centripetal acceleration compensation computer is normally available in the type of navigational system with which the compensation computer is used. Thus the apparatus may be built as a unit which is readily connected into an inertial navigation system to process available data and provide the required correction signals. The various components used in the circuitry and their functions are well known in the art and need not be herein described in detail. It should be understood that the circuit may be constructed using other types of components comparable to those indicated. For instance, the electro-mechanical motor-tachometer functions may be carried out electronically or by any other suitable means.

The operation of this invention will be clearly comprehended from a consideration of the foregoing description of the mechanical details thereof, taken in connection with the drawings and the above recited objects. It will be obvious that all said objects are amply achieved by this invention.

It is understood that minor variation from the form of the invention disclosed herein may be made without departure from the spirit and scope of the invention, and that the specification and drawings are to be considered as merely illustrative rather than limiting.

We claim:

1. In a navigational system for a vehicle: a stable platform having a gyroscope; said gyroscope having pick-off means sensitive to motion about a plurality of axes of freedom, and erecting means coupled thereto erect the gyroscope in a predetermined position; said platform including a heading accelerometer and a drift accelerometer sensitive to accelerations of the vehicle in heading and drift directions, respectively, and having outputs providing signals proportional to the corresponding accelerations; and a centripetal acceleration compensation computer connected to said stable platform; a source of vehicle heading input, a source of heading velocity input and a source of drift velocity input connected to said computer; computing means in said computer connected to said inputs and providing output signals proportional to the rate-of-change of heading multiplied by the heading and drift velocities; said last mentioned output signals being combined with the output signals of said accelerometers.

2. In a navigational system for use in a vehicle moving over the surface of the earth: a stable platform having a gyroscope; said gyroscope having pick-off means sensitive to motion about a plurality of axes of freedom, and erecting means coupled thereto to erect the gyroscope in a predetermined position; said platform including a heading accelerometer and a drift accelerometer sensitive to accelerations of the vehicle in heading and drift directions, respectively, and having outputs providing signals proportional to the corresponding accelerations; and a centripetal acceleration compensation computer connected to said stable platform; a source of vehicle heading input, a source of heading velocity input, a source of drift velocity input and a source of latitude input connected to said computer; computing means connected to said inputs and providing output signals proportional to the rate of change of heading multiplied by the heading velocity and drift velocity; said output signals being combined with the output signals of said accelerometers; further computing means connected to said inputs and having an output signal proportional to the square of the heading velocity multiplied by the tangent of latitude and the sine of the heading angle; said last mentioned output signal being combined with the output signal of said drift accelerometer.

3. A navigational system according to claim 2, wherein said computer has a further source of input connected thereto providing a signal proportional to the angular rotation of the earth multiplied by the cosine of the latitude; a resolver coupled to said heading input and connected to said further source of input to multiply the signal therefrom by the sine of the heading angle and the cosine of the heading angle, respectively, and providing resultant signals to said gyroscope erecting means.

4. In a navigational system for use in a vehicle moving over the surface of the earth: a stable platform having a gyroscope; said gyroscope having pick-off means sensitive to motion about a plurality of axes of freedom, and erecting means coupled thereto to erect the gyroscope in a predetermined position; said platform including a heading accelerometer and a drift accelerometer sensitive to accelerations of the vehicle in heading and drift directions, respectively, and having outputs providing signals proportional to the corresponding accelerations; and a centripetal acceleration compensation computer connected to said stable platform; a source of a vehicle heading input, a source of heading velocity input, a source of drift velocity input and a source of latitude input connected to said computer; computing means connected to said inputs and having a heading output signal and a drift output signal; said heading and drift output signals being proportional to $$V_H \frac{dH}{dt}$$

and $$V_D \frac{dH}{dt}$$

respectively, where $V_H$ is the heading velocity, $V_D$ is the drift velocity, H is the heading angle and $$\frac{d}{dt}$$

is the time factor; said heading output signal being combined with said drift accelerometer output signal, and said drift output signal being combined with said heading accelerometer output signal.

5. In a navigational system for use in a vehicle moving over the surface of the earth: a stable platform having a gyroscope; said gyroscope having pick-off means sensitive to motion about a plurality of axes of freedom, and erecting means coupled thereto to erect the gyroscope in a predetermined position; said platform including a heading accelerometer and a drift accelerometer sensitive to accelerations of the vehicle in heading and drift directions, respectively, and having outputs providing signals proportional to the corresponding accelerations; and a centripetal acceleration compensation computer connected to said stable platform; a source of vehicle heading input, a source of heading velocity input, a source of drift velocity input and a source of latitude input connected to said computer; computing means connected to said inputs and having a heading output signal and a drift output signal; said heading and drift output signals being proportional to $$V_H \frac{dH}{dt}$$

and $$V_D \frac{dH}{dt}$$

respectively, where $V_H$ is the heading velocity, $V_D$ is the drift velocity, H is the heading angle and $$\frac{d}{dt}$$

is the time factor; said heading output signal being combined with said drift accelerometer output signal, and said drift output signal being combined with said heading accelerometer output signal; further computing means for said inputs and having an output signal proportional to $$\frac{(V_H)^2}{r^1} \sin H \tan \lambda$$

where $r^1$ is the radius of curvature of the earth plus the distance of the vehicle above the earth's surface and $\lambda$ is the latitude; said last mentioned output signal being combined with said drift accelerometer output signal.

6. A navigational system according to claim 5, wherein said computer has a further source of input connected thereto providing a signal proportional to $\omega_e \cos \lambda$, where $\omega_e$ is the earth's angular velocity; a resolver connected to said further source of input and having output signals proportional to $\omega_e \cos \lambda \sin H_T$ and $\omega_e \cos \lambda \cos H_T$, where $H_T$ is the true heading of the vehicle; said last mentioned output signals being fed to said gyroscope erecting means.

7. A navigational system according to claim 4, wherein said computing means includes a heading follow-up means; a pair of tachometers driven in synchronization with said follow-up means; said tachometers being connected to and excited by the signals from said heading velocity and drift velocity inputs; the resultant signals from said tachometers being combined with said heading and drift accelerometer output signals, respectively.

References Cited in the file of this patent
UNITED STATES PATENTS 2,809,528    Serson et al.    Oct. 15, 1957
2,835,131    Vacquier et al.    May 20, 1958